July 16, 1935.  C. W. F. HAMILTON  2,008,354

MEANS FOR THE ELEVATION AND DISPOSAL OF SPOIL OR OTHER SUITABLE SUBSTANCES

Filed Nov. 11, 1932  3 Sheets-Sheet 1

Inventor:
C. W. F. Hamilton
By E. F. Wendroth
Atty

July 16, 1935.  C. W. F. HAMILTON  2,008,354
MEANS FOR THE ELEVATION AND DISPOSAL OF SPOIL OR OTHER SUITABLE SUBSTANCES
Filed Nov. 11, 1932   3 Sheets-Sheet 2

Patented July 16, 1935

2,008,354

UNITED STATES PATENT OFFICE 2,008,354

MEANS FOR THE ELEVATION AND DISPOSAL OF SPOIL OR OTHER SUITABLE SUBSTANCES

Charles William Fieldon Hamilton, Irishman Creek Station, Fairlie, New Zealand

Application November 11, 1932, Serial No. 642,314
In New Zealand January 6, 1932

24 Claims. (Cl. 37—9)

The object of the present invention is the provision of improved and novel means working on an entirely new principle for the elevation and disposal of spoil, shingle or other suitable materials whereby heavy manual labour is minimized and greater quantities of material can be collected for deposit for any given power. My improved means have great general efficiency owing to the reduction of the power required for the actual working stroke.

The principle or idea underlying the invention is the utilization of a wheel like member to act as a rotary conveyor to elevate spoil or other suitable materials scooped or otherwise inserted thereinto and eject same into a conveniently disposed receptacle or otherwise as desired.

It will be obvious from the following description that the wheel like member may be used separately or in conjunction with a vehicle or a container.

The constructional embodiment hereinafter disclosed shows my invention as applied to a scoop which will be found useful for loading spoil into a container for discharge at a desired point and in this particular embodiment the arrangement may conveniently comprise a container freely mounted between wheels, means secured to the container adapted to collect the spoil or like while the apparatus is in motion and discharge same into a conveyor trough incorporated in one of the wheels, baffle means secured to the container to deliver the said spoil from the said conveyor trough to the said container and means adapted to be actuated by the operator when seated on the tractive portion of the apparatus to cause the container to be held in and moved to desired positions for collecting, transporting or discharging the spoil, adjustable means preferably also being provided to permit of variation of the depth to which the means for collecting the spoil penetrate thereinto.

Figure 1:
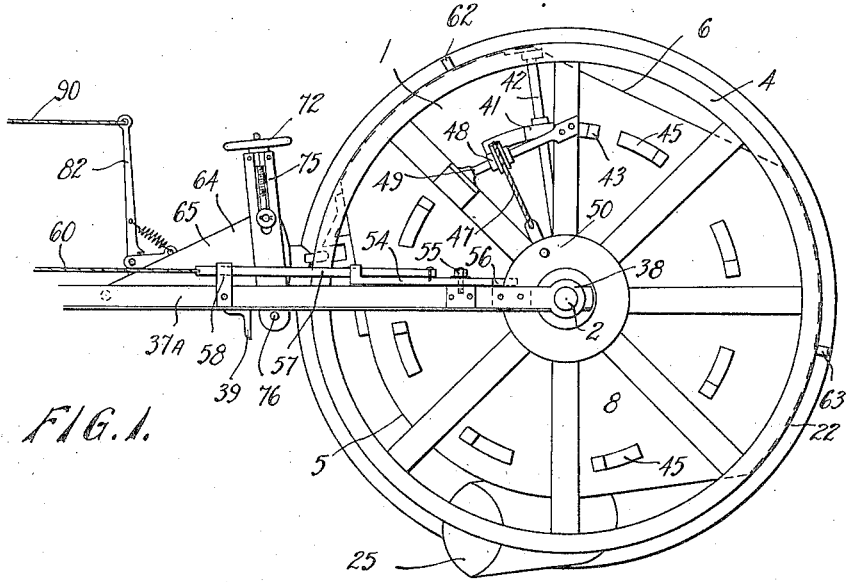
Figure 1 shows an elevation of the apparatus from the idle wheel side thereof.

The invention comprises a drum 1 substantially of cylindrical form horizontally and rotatably mounted on an axle 2 between two wheels, namely a loading wheel 3 and an idle wheel 4.

The drum 1 at its largest portion substantially conforms with the diameter of the two wheels 3 and 4 but has a portion of reduced diameter 5 (see Figure 3) so as to give clearance from ground level, an emptying opening 6 extending for the whole axial length of the drum 1.

The ends 7 and 8 of the drum 1 have flanged bosses 9 secured thereto united by a tubular member 10, bearing bushes 11 (see Figure 4) provided at these bosses 9 permitting the rotatable mounting of the drum 1 to axle 2, ribs 12 preferably extending radially from the boss 9 at the end 7 to give the latter added strength and rigidity.

Figure 5:
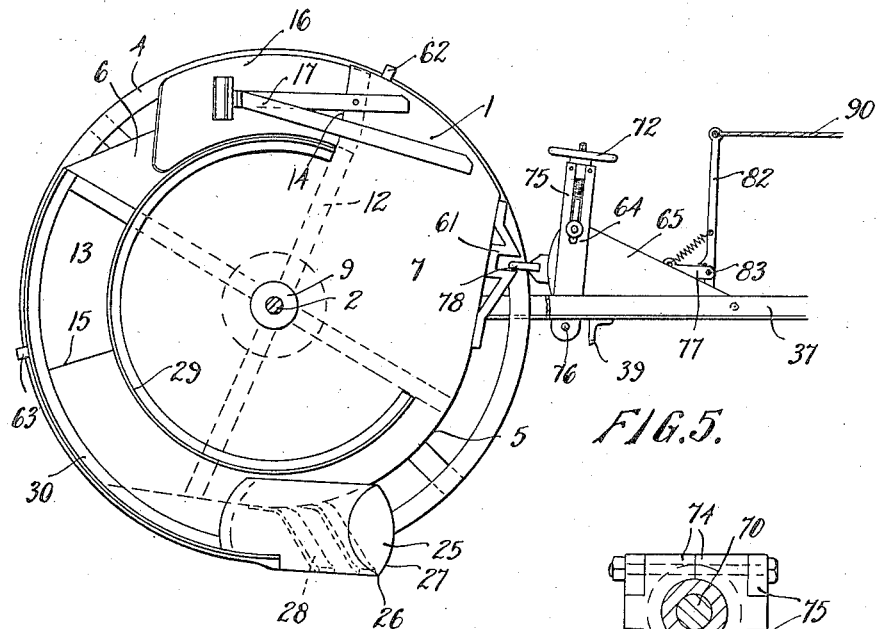
Figure 5 is a side elevation from the loading wheel side of the apparatus but with the loading wheel itself completely removed to clearly show the drum loading end.

In the end 7 of drum 1 there is an annular segmental opening or hole 13 (see Figure 5) extending from one edge 14 of the emptying opening 6 around for just over quarter of a circle to edge 15, one of the ribs 12 being conveniently disposed to act as a margin to edge 14.

Secured in suitable manner to the end 7 and extending from the edge 14 of segmental opening 13, a baffle plate 16 projects outwardly (see Figures 4 and 5) somewhat resembling a portion of a spiral, suitable stay or like means 17 being secured between the baffle plate 16 and end 7 to give the desired support to the outer end of the said baffle 16, the latter passing into an annular conveyor trough 18 (see Figure 4) within loading wheel 3, which is formed by having outer and inner rims 19 and 20 to said wheel 3 connected only at their outer edges by a ring 21, the outer rim 19 acting as the tread of the wheel 3 and preferably having a strengthening angle or like ring 22 at the inner edge, spokes 23 suitably connecting the inner rim 20 to a central boss 24 by way of which the complete wheel 3 is keyed rigidly to axle 2.

The baffle 16 conforms to the contour of the conveyor trough 18, the stay or like means 17 preventing said baffle 16 from bearing too hard against the ring 21.

Approximately oppositely disposed to the emptying opening 6 at the end 7 of the drum 1 and secured to the outside of the latter, there is the mouth 25 which projects in a forward direction and slightly downwardly from the surface of the drum 1, said mouth 25 resembling in form a miniature grader, with horizontal and vertical cutting or knife edges 26 and 27 and stayed at 28 in suitable manner so as to be rigid in relation to the drum 1, the cutting or knife edges 26 and 27 being adapted if desired to be removable for renewal or sharpening purposes.

The mouth 25 opens into the conveyor trough 18 in such manner that spoil collected by said mouth 25 would be diverted in a sideways direction into said conveyor trough 18 and to prevent escape of spoil when within the trough 18, outwardly projecting annular lips or borders 29 and 30 (see Figure 5) are secured on the drum end 7 to project (see Figure 4) into the plane of the wheel 3 immediately on the axle side of trough 18 and into the wheel trough 18 respectively so that such portion thereof which may be located between the mouth 25 and the baffle plate 16 is covered at its inner open side and substantially proof from escape of spoil.

The idle wheel 4 is of simple construction having a tread rim 31 with spokes 32 suitably secured thereto passing to central boss 33 rotatably mounted on axle 2.

Figure 3:
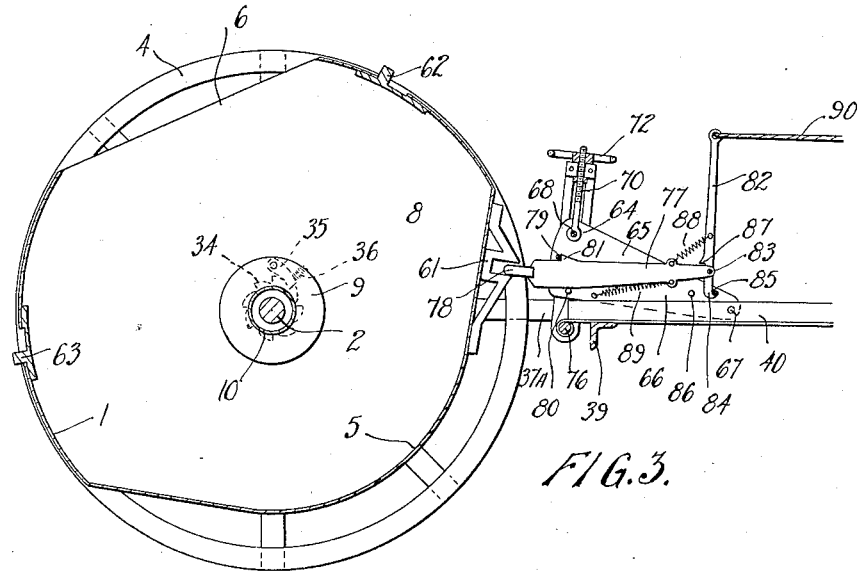
Figure 3 is a sectional side elevation from the loading wheel side of the apparatus.
Figure 4:
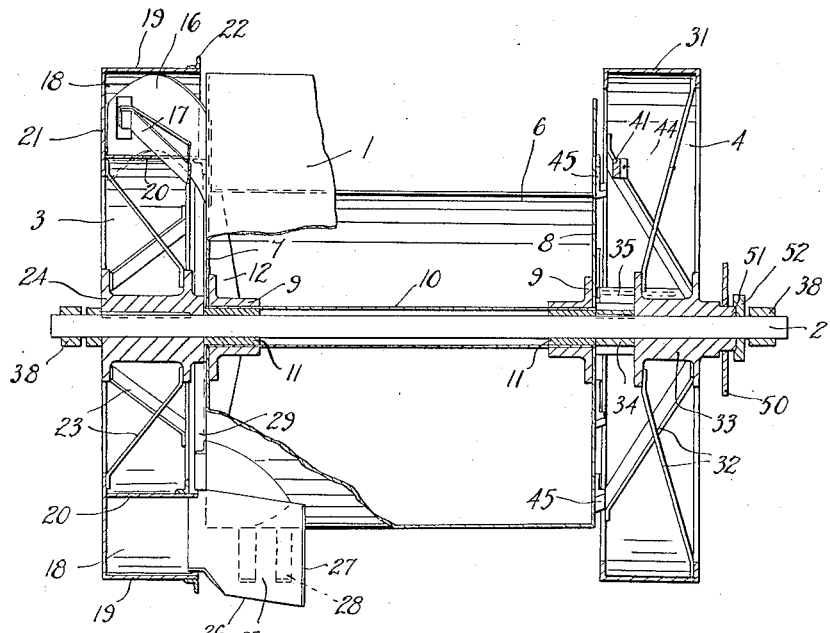
Figure 4 is a sectional front elevation of the apparatus with the portions of the drum in the vicinity of the baffle plate and the mouth shown in full.

The boss 33 is not of full wheel width so as to enable a ratchet wheel 34 to be keyed to axle 2 between wheel 4 and drum end 8, a pawl 35 being suitably secured to the wheel boss 33 with spring means 36 to keep it in engagement with said ratchet wheel 34 (see Figures 3 and 4).

The drawbar means by which the apparatus is secured to the tractive means comprises two suitable angle or like bars 37 and 37A with bearings 38 fitted over the extremities of axle 2, said bars 37 and 37A (see Figure 2) passing forwardly along the sides of wheels 3 and 4 and then being bent inwardly to converge, the two bars 37 and 37A jointed together (not shown) forming a suitable centrally disposed coupling of known type for securement to the tractive means.

A cross member 39 parallel to the axle 2 connects the bars 37 and 37A just in front of the wheels 3 and 4, and a member 40 passing from the forward juncture (not shown) of said bars 37 and 37A is secured to this cross member 39.

To the idle wheel 4 and the bar 37A to the side thereof mechanism is provided so that the operator of the apparatus can, when desired, lock the drum 1 to the idle wheel 4 and thereby impart rotation of the latter to the former.

This mechanism comprises (see Figures 1 and 2) a hinged arm 41 suitably mounted on a rod or like means 42 secured to idle wheel 4, the engaging end 43 thereof having a tension spring 44 fastened thereto passing to a suitable point on the wheel 4 and tending to hold the said engaging end 43 away from a set of lugs 45 secured to and arranged around the outside face of the drum end 8, these lugs 45 being preferably of hooked form and so shaped that pressure on their faces will not tend to keep the engaging end 43 in engagement with a lug 45.

The forward end 46 of arm 41 has a rope, chain or the like 47 secured thereto passing to and over a sheave 48 suitably and rotatably mounted to a support 49 secured to wheel 4, this rope 47 being at its other end suitably secured to a disc 50 freely and rotatably mounted over a reduced extension 51 of wheel boss 33 which is covered at its end by recessed washer 52.

Figure 2:
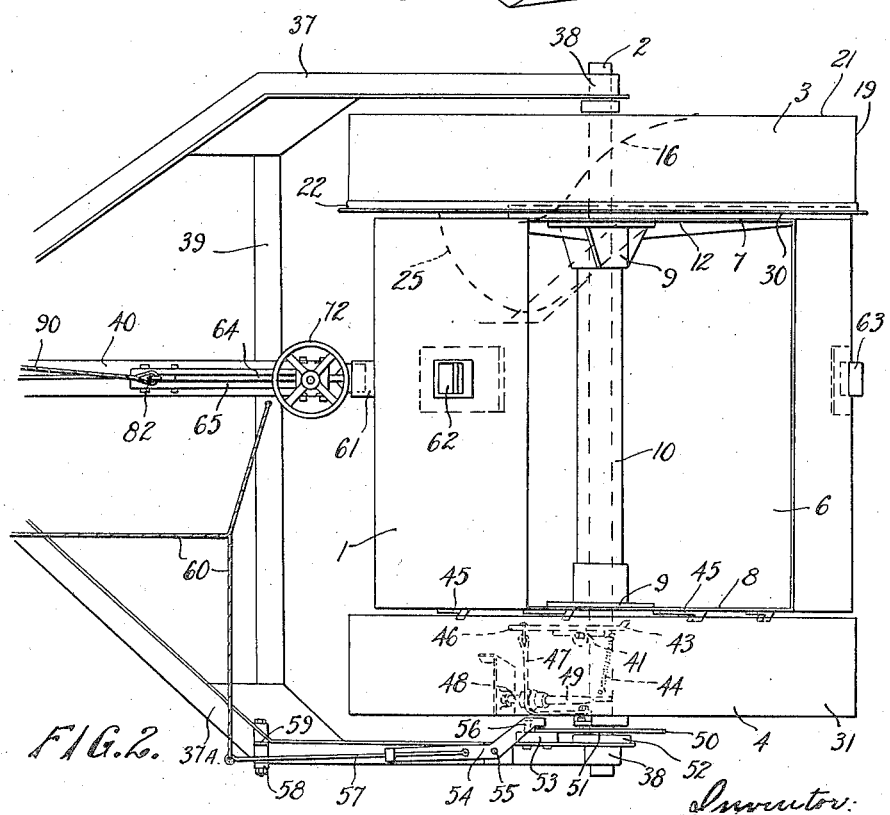
Figure 2 is a plan view of Figure 1.

This disc 50 is adapted at its outer face to come into fairly close contact with a brake block 53 mounted on bar 37A, a lever 54 pivoted to bar 37A by pin, bolt or like 55 having its engaging end 56 bent to pass to the inner face of the disc 50 in such manner as to, on movement of the lever 54, cause the disc 50 to be pressed against brake block 53, the forward end of lever 54 having a light bar 57 of spring material (such as spring steel) secured thereto and passing forward to between two stops 58 and 59 secured to the bar 37A, rope means 60 fastened to the end of this light bar 57 being suitably arranged to pass to the apparatus operator who will be forward on the tractive means so that by pulling the rope means 60 the light bar 57 will move towards stop 59 (see Figure 2).

On the drum 1 and the drawbar member 40, mechanism is provided for locking the drum 1 in three main positions and for making adjustments thereof, these positions being the working position wherein the mouth 25 is engaged in the ground to collect spoil as shown in Figures 1, 3, 4 and 5, the second or transporting position, wherein the mouth 25 is clear of the ground and the drum 1 is also quite clear thereof, and the third or discharging position wherein the drum 1 is inverted so that the emptying opening 6 points downwardly and permits discharge of the spoil contained in the said drum.

Around the drum 1 there are secured stops for obtaining the three main positions of the drum, these stops being the main stop 61, transporting stop 62 and emptying stop 63, these being adapted to be engaged by latch mechanism 64 mounted on the drawbar member 40.

Figure 7:
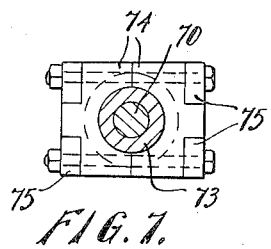
Figure 7 is a sectional plan view on line A—B of Figure 6.
Figure 6:
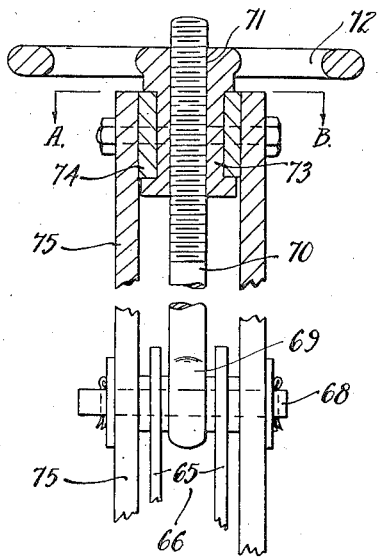
Figure 6 shows a partial sectional view of the latch apparatus.

This mechanism 64 comprises (see Figures 3, 6 and 7) two oppositely disposed housing plates 65 with a space 66 between (Figure 6) these plates 65 being pivotally mounted at 67 to opposite sides of the drawbar member 40 at their front ends and pivotally secured at 68 to the eye 69 of the threaded adjustment rod 70, this latter passing (Figure 6) into the threaded bore 71 of the handwheel 72 which has a recessed boss 73 enabling it to rotate within a split bearing bush 74 said bearing bush 74 being bolted or otherwise secured to the two oppositely disposed slotted bars 75 pivotally secured at 76 at their lower ends to the rear end of the drawbar member 40.

Within the space 66 between the housing plates 65 there is the latch 77 (see Figure 3) having a horizontally broadened engaging rear end 78 and adapted to be guided by two guide rollers or members 79 and 80, a lug projection 81 on the latch 77 limiting rearward movement of the said latch 77 by encountering the guide member 79.

At the forward end of the latch 77 the actuating lever 82 is pivotally secured at 83, its lower extension being hooked at 84 for engaging under a pin 85 across the space 66 there being a further similar pin 86 slightly to the rear of pin 85.

A stop lug 87 is provided on actuating lever 82 and tension spring 88 passes from a point above pivot 83 to the latch 77, a further tension spring 89 passing from the underside of the latch and rearwardly to a pin secured across space 66.

A control rope 90 passes from the upward end of the actuating lever 82 to the apparatus operator at the tractive means.

In operation the drum 1 is in the position as shown in Figures 1 to 5 during the spoil collecting stage of operation, the main stop 61 being engaged by the engaging end 78 of latch 77 and prevented from rotation by such engagement.

With the scoop in motion, the mouth 25 collects the spoil or like and directs same into the bottom of conveyor trough 18 and accumulation of this spoil at the mouth and the forward rotation of wheel 3 causes the spoil to move rearward and upward within trough 18 until it encounters the baffle plate 16 and this latter being of spiral form causes said spoil to be moved inwardly through the opening 13 in drum end 7 so that the said spoil accumulates within drum 1.

During such operation, as wheel 3 tends to take all that portion of the load required for the elevation of the spoil within conveyor trough 18, if wheel 3 should tend to slip or lag behind, the pawl 35 engaged in the ratchet wheel 34 causes wheel 4 to assist wheel 3 by transmitting its drive through said pawl 35 and ratchet wheel 34 to the axle 2 to which wheel 3 is keyed.

Obviously to prevent this slip of wheel 3, ribs or like could be secured across outer rim 19 of the wheel 3 or on both wheels 3 and 4 but these are not essential in most general cases.

As the conditions of the ground over which the scoop may have to work may vary considerably, that is to say, some may be soft and some hard it may be desired to vary the depth of cut to be taken by the mouth 25.

This is done by varying the distance the mouth 25 projects downwardly below the wheel bottom level, which is to say, ground level and to effect this variation, handwheel 72 of the latch mechanism 64 is rotated so that by causing the pivot 68 to be raised, the rear ends of housing plates 65 and also the rear end of the latch 77 will also be raised, with the result that due to the engaging end 78 of the latch 77 being similarly raised, the drum 1 and the mouth 25 will be moved an amount which would cause the said mouth 25 to have been moved forwardly and upwardly so that it would take a shallower cut.

Having filled the drum 1 with spoil, it being then desired to transport said spoil to the site where it has to be deposited, the operator seated on the tractor or other tractive means pulls rope 90 and this causes the actuating lever 82 to move forward and also the latch 77 to move similarly against the withholding tendency of tension spring 89.

This forward movement of the latch 77 causes its engaging end 78 to move clear of the main stop 61 and due to the scoop still moving forward, the mere engagement of the mouth 25 in the ground will be sufficient to cause drum 1 to rotate in like direction to wheels 3 and 4, and as the operator releases the rope 90 as soon as the drum 1 commences to so rotate, said drum 1 will rotate until its stop 62 engages latch engaging end 78.

Thus the drum 1 is held in such position with its portion or reduced diameter 5 lowermost and the mouth 25 clear of the ground until the scoop has travelled to the site at which the spoil is to be deposited.

The operator then again pulls rope 90 to release latch 77 from stop 62 and the drum rotates until the latch end 78 engages stop 63, the rope 90 having been released to enable spring 89 to move latch 77 rearwardly until its lug 81 encounters roller or guide 79.

In this position, the drum 1 has its emptying opening 6 lowermost so that the spoil falls through said opening 6 from said drum, the empty scoop then returning to collect a further load, the operation of rotating the drum from emptying position to working or loading position being similar to that described.

Now as described above, it may appear that to withdraw the engaging end 78 of the latch 77 from engagement with main stop 61 only requires an easy outward movement of the latch 77 but when it is considered that with the scoop in motion, the mouth 25 is digging into the spoil and the only member preventing rotation of the drum 1 is this latch 77, it will then be understood that the drum 1 exerts considerable pressure on the latch 77 and the power required to move the latch 77 directly outward would be considerable.

To make a comparatively light pull on the rope 90 effect release of the latch from stop 61 (or stop 62 or 63) the pressure of the drum 1 on said latch is utilized to assist such release.

When the rope 90 is pulled, the hooked end 84 of actuating lever moves rearwardly clear of pin 85 and thus the downward pressure of the top 61 on the engaging end 78 of latch 77 causes said end 78 to cant downwardly and then to be moved outwardly towards guide rollers or members 79 and 80, and as soon as the stop 61 has moved clear of the engaging end 78, and the pull on rope 90 is released, the spring 89 pulls the latch 77 back into normal position as in Figure 3.

If by any chance it was desired to back the scoop, as there would then be little or no pressure on the latch 77 applied by drum 1, the pull of the rope 90 would cause the hooked end 84 of actuating lever 82 to encounter stop pin 86 and then draw the latch 77 truly forward.

In actual use, it has been found that in most general cases it is not necessary to bring the mechanism of the idle wheel 4 into operation for the purpose of causing rotation of the drum 1, the latter of its own accord tending to rotate along with the wheels 3 and 4.

However, if and when the drum 1 does not rotate when desired, the rope 60 is pulled and this causes the light bar 57 (Figure 2) to move over towards stop 59 and the lever engaging end 56 to press the disc 50 against brake block 53 and as this disc 50 rotates along with wheel 4 due to rope 47 being secured thereto, this pressing of the disc 50 against brake block 53 causes it to tend to lag behind in such rotation, such lag being that amount permitted by pulling rope 47 towards the disc 50 and causing the engaging end 43 of arm 41 to engage over one of the lugs 45 and this engagement of the arm end 43 with a lug 45 causes rotation of wheel 4 to be transmitted to drum 1 at such time when the latch 77 is withdrawn from a drum stop.

Now as previously mentioned, the arm 43 is not required to engage in lugs 45 in hook action as this would cause the drum 1 to be suddenly jerked into rotation along with the wheel 4, with possibility of damage and jambing of a stop 61, 62 or 63 against latch engaging end 78, and thus the arm 43 simply tends to induce rotation of the drum 1 so that even though a stop is engaged with latch end 78 and the arm end 43 engaged in a lug 45, the arm end 43 would simply slip from one lug to the next due to the fact that the disc 50 is not prevented from rotating along with wheel 4 by being pressed against brake block 53 but its rotation is merely resisted sufficiently to cause a pull to be applied on rope 47.

Obviously from the foregoing, it will be seen that the two ropes 60 and 90 passing to the scoop operator on the tractive means could if desired be suitably coupled together to make the pulling of one rope by the said operator effect the double purpose of withdrawing the latch means 64 and engaging the drum 1 with wheel 4.

I claim:

1. A machine of the class described comprising a rotatable container, wheels between which said container is mounted, means secured rigidly to the container for collecting spoil, a trough conveyor located in one of said wheels into which said spoil is discharged from said collecting means and means for directing said spoil from said trough conveyor into said container.

2. A machine of the class described comprising a container rotatably mounted upon a shaft, a wheel upon said shaft upon each side of said container for transporting the same, a trough conveyor located in one of said wheels, scoop means fixed rigidly to said container for directing spoil into said trough conveyor and a baffle extending into said trough conveyor for directing the spoil from said conveyor to said container.

3. A machine of the class described comprising a rotatable container, wheels located upon each side of said container, a trough conveyor located in one of said wheels, means for connecting said container to one of said wheels so as to rotate the same, means mounted rigidly upon said container for collecting spoil and directing the same into said trough container and means also secured to said container for directing the spoil from said trough conveyor into said container.

4. A machine of the class described comprising a pair of spaced wheels, a container located between said wheels, a collector upon said container and means for fixing said container in either a collecting position, a transporting position or an emptying position so that when said container is in transporting position said collector is inoperative.

5. A machine of the class described comprising a pivotally mounted container, means for transporting said container, means for collecting spoil and delivering the same to said container associated with the transporting means for said container and means for fixing said container in collecting position, transporting position or emptying position at different angles about the axis thereof so that when said container is in transporting position said means for collecting spoil are rendered inoperative.

6. A machine of the class described comprising a container, wheels upon each side of said container, means associated with one of said wheels for collecting spoil and delivering the same to said container and means for fixing said container in different positions about its axis so as to collect, transport or discharge the spoil in said container so that when said container is in transporting position said means for collecting spoil are rendered inoperative.

7. A machine of the class described comprising a rotatable container, a scoop fixed rigidly to said container, a trough conveyor associated with said scoop for transporting the spoil collected by said scoop to said container and means for adjusting said scoop with relation to said container.

8. A machine of the class described comprising a container pivotally mounted between a pair of wheels, a trough conveyor located in one of said wheels, a scoop fixed rigidly to said container for directing spoil into said trough conveyor, means upon said container for directing the spoil from said trough conveyor to said container and means associated with the other wheel for adding its traction force to that of the wheel containing the trough conveyor whenever necessary.

9. A machine of the class described comprising a container, a collecting wheel located upon one side of said container, an idle wheel rotating upon the other side of said container and means whereby said idle wheel may be locked to the container whenever necessary.

10. A machine of the class described comprising a container, a collecting wheel located upon one side of said container, an idle wheel located upon the other side of said container and means associated with said idle wheel for rotating said container about its axis whenever desired.

11. A machine of the class described comprising a container, a collecting wheel located upon one side of said container, an idle wheel located upon the other side of said container, lugs upon said container and means upon said idle wheel cooperating with said lugs for rotating said container about its axis to collecting, transporting and discharging positions.

12. A machine of the class described comprising a container, a collecting wheel upon one side of said container, an idle wheel upon the other side of said container and means controlled by the operator for adjusting said container to collecting, transporting or discharging positions.

13. A machine of the class described comprising a container, wheels upon which said container is mounted, means secured to the container for collecting spoil, a trough conveyor located in one of said wheels into which said spoil is discharged from said collecting means, means for directing said spoil from said trough conveyor into said container and means for moving said container so as to render said means for collecting spoil inoperative.

14. A machine of the class described comprising a container, wheels upon which said container is mounted, means secured to the container for collecting spoil, a trough conveyor located in one of said wheels into which said spoil is discharged from said collecting means, means for directing said spoil from said trough conveyor into said container and means for rotating said container so as to render said means for collecting spoil inoperative.

15. A machine of the class described comprising a container pivotally mounted, wheels upon which said container is mounted for transporting the same, a scoop for collecting spoil fixed to said container, a trough conveyor located in one of said wheels into which the spoil collected by said scoop discharges, means for collecting the spoil from said trough conveyor to said container and means for moving said container so as to render said scoop inoperative.

16. A machine of the class described comprising a container pivotally mounted, wheels upon which said container is mounted for transporting the same, a scoop for collecting spoil fixed to said container, a trough conveyor located in one of said whees into which the spoil collected by said scoop discharges, means for collecting the spoil from said trough conveyor to said container and means for rotating said container so as to render said scoop inoperative.

17. A machine of the class described comprising a container, supporting means for said container, spoil collecting means mounted upon said container and means for moving said container with relation to said supporting means so as to render said spoil collecting means inoperative.

18. A machine of the class described comprising a container, supporting means for said container, spoil collecting means mounted upon said container and means for rotating said container relative to said supporting means so as to render said spoil collecting means inoperative.

19. A machine of the class described comprising a movable container, wheels between which said container is mounted, means secured to the container for collecting spoil, means associated with one of said wheels for conveying said spoil from said collecting means into said container and said spoil collecting means being so mounted as to become inoperative when said container is moved relative to said wheels.

20. A machine of the class described comprising a rotatable container, wheels between which said container is mounted, means secured to the container for collecting spoil, means associated with one of said wheels for conveying said spoil from said collecting means into said container and said spoil collecting means being so secured as to become inoperative when said container is rotated.

21. A machine of the class described comprising a container rotatably mounted upon a shaft, a wheel upon said shaft upon each side of said container for transporting the same, a trough conveyor located in one of said wheels, scoop means fixed to said container for directing spoil into said trough conveyor, a baffle extending into said trough conveyor for directing the spoil from said conveyor to said container and said scoop means becoming inoperative when said container is rotated.

22. A machine of the class described comprising a rotatable container, wheels located upon each side of said container, a trough conveyor located in one of said wheels, means for connecting said container to one of said wheels so as to rotate the same, means mounted upon said container for collecting spoil and directing the same into said trough container, means secured to said container for directing the spoil from said trough conveyor into said container and said spoil collecting means becoming inoperative upon rotation of said container.

23. A machine of the class described comprising a container, wheels located upon each side of said container for transporting the same, means associated with one of said wheels for gathering spoil and directing the same into said container, means for rotating said container so as to empty the same and means operative upon rotation of said container for rendering the spoil gathering means inoperative.

24. A machine of the class described comprising a rotatable container, a scoop fixed to said container, a trough conveyor associated with said scoop for transporting the spoil collected by said scoop to said container, means for adjusting said scoop with relation to said container and means operative upon rotation of said con-

CHARLES WILLIAM
    FIELDON HAMILTON. [L. S.]